US011360109B2

(12) United States Patent
Beauducel et al.

(10) Patent No.: US 11,360,109 B2
(45) Date of Patent: Jun. 14, 2022

(54) BIOLOGICAL ANALYSIS SYSTEM

(71) Applicant: HORIBA ABX SAS, Montpellier (FR)

(72) Inventors: Florent Beauducel, Montpellier (FR);
Philippe Benezeth, Caissargues (FR);
Thibault Cres, Vendargues (FR)

(73) Assignee: HORIBA ABX SAS, Montpellier (FR)

( * ) Notice: Subject to any disclaimer, the term of this patent is extended or adjusted under 35 U.S.C. 154(b) by 299 days.

(21) Appl. No.: 16/479,097

(22) PCT Filed: Jan. 17, 2018

(86) PCT No.: PCT/FR2018/050111
§ 371 (c)(1),
(2) Date: Jul. 18, 2019

(87) PCT Pub. No.: WO2018/134518
PCT Pub. Date: Jul. 26, 2018

(65) Prior Publication Data
US 2019/0376989 A1 Dec. 12, 2019

(30) Foreign Application Priority Data

Jan. 19, 2017 (FR) ...................... 1750430

(51) Int. Cl.
*G01N 35/00* (2006.01)
*G01N 35/02* (2006.01)
(52) U.S. Cl.
CPC ....... *G01N 35/0092* (2013.01); *G01N 35/026* (2013.01)
(58) Field of Classification Search
CPC ... G01N 35/0092; G01N 35/04; G01N 35/026
See application file for complete search history.

(56) References Cited

U.S. PATENT DOCUMENTS

2011/0162438 A1* 7/2011 Tokieda .......... G01N 35/00732
73/61.59
2014/0273242 A1 9/2014 Ochranek et al.

FOREIGN PATENT DOCUMENTS

EP 2330425 A1 6/2011
JP H10282111 A 10/1998

OTHER PUBLICATIONS

International Search Report received in PCT/FR2018/050111 dated Apr. 25, 2018 with English Translation.

* cited by examiner

*Primary Examiner* — Shogo Sasaki
(74) *Attorney, Agent, or Firm* — ArentFox Schiff LLP

(57) ABSTRACT

A biological analysis system comprises at least two biological analysis devices connected to one another by a conveyor defining a closed circuit, each biological analysis device comprising at least one inlet and one outlet for racks of tubes, and at least one exchange region for exchanging racks of tubes with the conveyor, which exchange region is distinct from the inlet and from the outlet. The inlet of at least two biological analysis devices each form an inlet of the biological analysis system for racks of tubes, and the outlet of at least two biological analysis devices each form an outlet of the biological analysis system for racks of tubes. The biological analysis system further comprises a controller designed to command the transfer of a rack of tubes received in the biological analysis system via the conveyor to another biological analysis device according to the operations to be performed on the tubes in that rack and/or according to a respective workload status of the biological analysis devices.

7 Claims, 1 Drawing Sheet

BIOLOGICAL ANALYSIS SYSTEM

CROSS-REFERENCE TO RELATED APPLICATIONS

Figure 1:
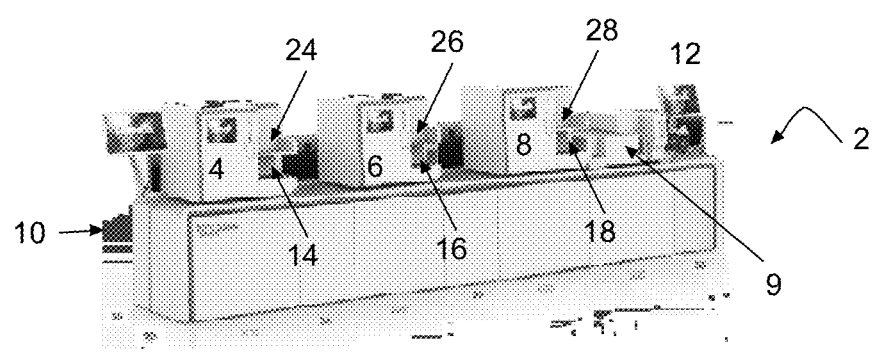

This application is a National Stage Entry of PCT/FR2018/050111, filed Jan. 17, 2018, which claims priority to French Patent Application No. 1750430 filed on Jan. 19, 2017, the disclosures of each of which are hereby incorporated by reference in their entireties.

The invention relates to the field of biological analysis and the automation thereof.

In a biological analysis laboratory, optimal management of the flow of specimens has become a crucial factor. This is because the larger a laboratory, the more complicated and necessary it becomes to optimize the management of the flow of biological samples being analyzed. There are two criteria that are particularly important to consider: the specimen treatment time, and the workload that each action imposes on the laboratory staff.

In order to improve performance according to these criteria, biological analysis systems have been developed which are based on the principle of placing a number of biological-analysis devices in communication with one another via a means for transporting racks that hold tubes of specimens. Combining several devices via the transport means allows better management of breakdowns, problematic situations, and allows certain flow management strategies to be implemented.

These systems generally comprise an inlet for the holding racks, a transport means which distributes the racks at the inlet to one of the devices connected to it, and an outlet for the racks that have been analyzed. Certain systems may comprise a buffer zone at the inlet and/or at the outlet, and may employ flow management algorithms.

However, these systems can be improved both in terms of their flow management and in terms of the bulk that characterizes them.

The invention seeks to improve the situation. To that end, the invention proposes a biological analysis system comprising at least two biological analysis devices connected to one another by a conveyor defining a closed circuit, each biological analysis device comprising at least one inlet and one outlet for racks of tubes, and at least one exchange region for exchanging racks of tubes with the conveyor, which exchange region is distinct from the inlet and from the outlet.

The inlet of at least two biological analysis devices each form an inlet of the biological analysis system for racks of tubes, and the outlet of at least two biological analysis devices each form an outlet of the biological analysis system for racks of tubes, the biological analysis system further comprising a controller designed to command the transfer of a rack of tubes received in the biological analysis system via the conveyor to another biological analysis device according to the operations to be performed on the tubes in that rack and/or according to a respective workload status of the biological analysis devices.

This biological analysis system is particularly advantageous because it allows gains to be made in terms of compactness, the inlets and outlets of the system being embodied by the inlets and outlets of the devices of which it is composed. In addition, having several inlets and several outlets for the system makes it possible to implement flow management strategies that allow the workload of the laboratory staff to be optimized and that make it possible to obtain a smart distribution of the racks. Further, the multiple inlets and/or outlets make it possible to obtain a device that can be modified and customized. Specifically, the user can elect to load one or more inlets with racks containing tubes.

According to various alternative forms, the accessory according to the invention may exhibit one or more of the following features:
- the controller is designed to command the biological analysis system to output a given rack of tubes via a chosen outlet of the biological analysis device which is chosen according to a workload status of the outlets of the biological analysis device,
- the controller is designed to command the biological analysis system to output a given rack of tubes via a chosen outlet of the biological analysis system which is chosen according to an event associated with the analysis of the tubes of the given rack of tubes and/or according to subsequent analyses scheduled for one or more of the tubes of that rack of tubes,
- the controller is designed to command the biological analysis system to output a given rack of tubes via an outlet which is such that a given outlet is chosen exclusively according to the results of the analyses of the tubes of the given rack of tubes or according to a workload status of the outlets of the biological analysis device,
- the controller is designed to transfer a given rack of tubes from a first biological analysis device to a second biological analysis device when the following conditions are met:
  - the workload status of the first biological analysis device indicates an overload,
  - the workload status of the second biological analysis device does not indicate an overload,
  - the second biological analysis device is capable of performing at least some of the analyses scheduled for the tubes held in the given rack of tubes,
- the controller is designed to command that one or more tubes of a given rack of tubes be treated/processed by a biological analysis device comprising the inlet via which the given rack of tubes was introduced into the biological analysis system when the following conditions are met:
  - the workload status of the biological analysis device does not indicate an overload,
  - the biological analysis device is capable of performing at least some of the analyses scheduled for the tubes held in the given rack of tubes, and
- the controller is designed to command that a given rack of tubes be output from the biological analysis system via the outlet of that biological analysis device that comprises the inlet via which the given rack of tubes was introduced into the biological analysis system.

The invention also relates to a biological analysis system comprising at least one inlet and at least two outlets which are connected to at least two biological analysis devices which are connected to one another by a conveyor defining a closed circuit, each biological analysis device comprising at least one exchange region for exchanging racks of tubes with the conveyor, which exchange region is distinct from the at least one inlet and from the at least two outlets, the biological analysis system further comprising a controller designed to command the transfer of a rack of tubes received in the biological analysis system via the conveyor to another biological analysis device according to the operations to be performed on the tubes in that rack and/or according to a respective workload status of the biological analysis devices.

The invention also relates to a biological analysis method involving introducing a plurality of racks of tubes into a biological analysis system according to the invention, and transferring a rack of tubes that is received in the biological analysis system via the conveyor to another biological analysis device according to an event associated with the analysis of the tubes of the given rack of tubes and/or according to subsequent operations scheduled for one or more of the tubes in that rack of tubes and/or according to a respective workload status of the biological analysis devices.

Figure 2:
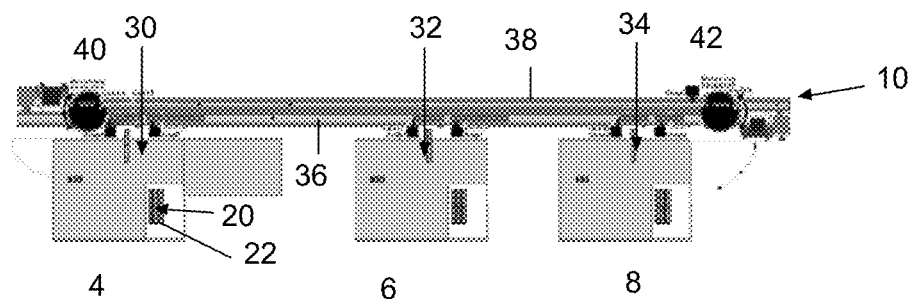

Further features and advantages of the invention will become better apparent from reading the following description, taken from illustrative and nonlimiting examples taken from the drawings, in which:

FIG. 1 depicts a perspective view of a biological analysis system according to the invention, and FIG. 2 depicts a view of FIG. 1 from above.

The drawings and the description that follow essentially contain elements of certain nature. They may therefore serve not only the better to understand the present invention, but also to contribute to the definition thereof, where appropriate.

FIG. 1 depicts a perspective view of a biological analysis system 2 according to the invention, and FIG. 2 depicts a view of FIG. 1 from above. As can be seen in this figure, the biological analysis system 2 comprises three biological analysis devices 4, 6 and 8, a slide staining/spreading device 9, a conveyor 10 and a controller 12.

In the example described here, the biological analysis devices 4, 6 and 8 are of the hematology analyzer type. The biological analysis device 4 (or 6, 8, respectively) comprises a stage 14 (or 16, 18, respectively) which receives racks 20 of tubes 22 that are to be analyzed. The biological analysis device 4 (or 6, 8, respectively) also comprises a stage 24 (or 26, 28, respectively) which receives the racks 20 of tubes 22 which have been analyzed. The biological analysis device 4 (or 6, 8, respectively) also comprises an exchange region 30 (or 32, 34, respectively) which allows a rack 20 to be transferred onto the conveyor 10 or a rack 20 to be received from said conveyor.

The three hematology analyzers 4, 6, 8 are able to measure a specimen of blood contained in a tube 22. Each apparatus picks up the tube 22 contained in a rack 20 which is positioned either on a loading stage or on the conveyor, behind the measurement apparatus. When the blood specimen measurement is complete, the apparatus places the tube back in a rack.

The slide staining/spreading device 9 prepares the slides of blood which are intended to be analyzed. First of all, a volume of blood is taken from a tube 22 which is held in a rack 20. Next, the blood sample is deposited on a slide, spread across the slide in order to obtain a thin layer, and then dried. The specimen is then stained.

The conveyor 10 defines a closed circuit and in the example described here comprises a line in the form of a loop comprising two paths 36 and 38. The line 36 is connected to each of the exchange regions 30, 32 and 34 so that a rack 20 is introduced onto the conveyor 10, or recovered from same, from the path 36. The conveyor 10 drives the path 36 in one direction and the line 38 in a direction opposite to the direction of driving of the line path 36.

The conveyor 10 also comprises two return devices 40 and 42 which are respectively positioned downstream of the device 4 and upstream of the device 8 in relation to the direction of driving of the path 36.

The purpose of the return device 40 is to transfer a rack 20 from the path 36 to the path 38, and the purpose of the return device 42 is to transfer a rack 20 from the path 36 to the path 38 by rotation through 180°. Thus, whatever the exchange region 30, 32 or 34 via which a rack 20 has been introduced onto the conveyor 10, this rack 20 can be sent to any one of the devices 4, 6 or 8, according to transport rules. This capability, whatever means are employed in order to implement it, characterizes the fact that the conveyor 10 defines a closed circuit.

As an alternative, the conveyor 10 may be produced in the form of two lines 36 and 38 driven independently and connected by the return devices 40 and 42.

Thus, the stages 14, 16 and 18 form inlets for the system 2, the stages 24, 26 and 28 form outlets for the system 2, and the exchange regions 30, 32 and 34 for exchanges between the devices 4, 6 and 8 and the conveyor 10, are distinct from the inlets and outlets of the system 2.

In various alternative forms, the inlet and the outlet of one or more devices may be interchanged, or may be produced on the one same stage, with suitable separation between them. Similarly, depending on the configurations, the exchange region may be situated closer to the inlet and to the outlet of one or more devices, provided that these still remain clearly distinct from one another.

In the example described here, the specimens contained in the tubes 22 of one rack 20 may be subjected to analysis in the biological analysis device into which that rack has been introduced into the system 2 before being transferred to the conveyor 10 or leaving directly via one of the stages 24, 26 or 28 without passing via the conveyor 10, or may be transferred directly from the inlet via which it was introduced toward the exchange region of the device concerned.

The controller 12 in the example described here is a computer which in the conventional way comprises a display, a dispatcher, a memory and a network interface allowing it to communicate with the biological analysis devices.

The memory may be any type of data storage device suited to receiving digital data: hard disk, solid-state drive (SSD) or flash memory in any other form, random access memory, magnetic disk, storage distributed locally or in the cloud, etc. The data calculated by the device may be stored on any type of memory similar to the memory 2 or in that memory. These data may be erased after the device has performed its tasks, or may be saved.

The dispatcher accesses the memory directly or indirectly in order to implement the functions of the controller 12. It may be produced in the form of a suitable computer code executed on one or more processors. What is meant by processors is any processor designed to process computer data. Such a processor may be produced in any known way, in the form of a microprocessor for a personal computer, of a dedicated chip of FPGA or SoC (System on Chip) type, of a computing grid resource, of a microcontroller, or in any other form capable of providing the computing power needed for the embodiment described below. One or more of these elements may also be produced in the form of specialized electronic circuits such as ASICs. A combination of one or more processors and of one or more electronic circuits may also be envisioned.

The controller 12 is connected to the biological analysis devices 4, 6 and 8 in order to know all the data regarding the analyses performed and in progress and the status of the racks 20 received in these devices, and is also connected to the conveyor 10 notably in order to know what racks 20 this conveyor is carrying.

Thus, the controller 12 is able to organize the flow of racks 20 throughout the biological analysis system 2, by having access to all the data characterizing the status of the racks 20 in the process of being treated, the status of the analyses in progress and the analyses already performed, and the analyses scheduled for the racks 20 received at the inlets of the system 2.

The controller 12 is therefore in a position to determine a workload status for each of the biological analysis devices 4, 6 and 8 and command the transfer of racks 20 on the conveyor 10 from one device to another according to a workload status of the devices, according to strategies for managing the workload of the biological analysis system 2, according to the breakdown of the workload of staff interacting with the biological analysis system 2, according to additional analyses required, according to breakdowns, according to the number of analysis devices on the line, etc.

What is meant by the workload status is the total number of racks that a biological analysis device receives, added to the number of racks on the conveyor that are intended for that device. The workload status of a given biological analysis device is considered to be "overloaded" when this number exceeds a predetermined quantity. In the example described here, this quantity is fixed at ⅔ of the number of racks that the biological analysis device is able to accept. As an alternative, this value may be determined dynamically by the controller 12 on the basis of the operating conditions and/or on the basis of a number of parameters: the anticipated work rate of the system, the number of free spaces on the agitator or agitators of the device concerned, the mean time taken to move a rack from one device to another, etc.

For example, in a system comprising three analysis devices, a conveyor comprising two paths and two return mechanisms connecting the two paths, the predetermined quantity beyond which an analysis device will be considered to be overloaded may be a chosen number of racks received or heading for that analysis device. Thus, when the number of racks received or heading for the analysis device is equal to the chosen number, that device will be incapable of accepting additional racks. The racks will be distributed to other analysis equipment for which the quantity of racks received by, or heading for, them is below the chosen number. This chosen number is determined via several criteria including in particular: the number of devices joined together, the length of the conveyor, the swiftness of the exchange zones or else the speed at which the rack travels on the conveyor.

The controller 12 has the task of determining which racks are to be taken over by a biological analysis device other than the one at which they were introduced into the system 2 in order to improve the work rate and/or take account of imponderables, and to determine the outlets for the racks that have been analyzed. The controller 12 may therefore implement one or more current-workload management strategies and one or more outlet management strategies.

With reference to the current-workload management strategies, according to one preferred embodiment of the invention, if a biological analysis device receives at its inlet a rack of tubes for which it is able to carry out all the required analyses, or if the number of required analyses that it knows how to carry out exceeds a chosen quantity (for example 75% of the required analyses), then the rack is taken up by that instrument. Knowledge as to what analyses are to be carried out can be obtained by reading information off the rack and/or off the tubes held therein and/or by accessing a database.

Dispatching onto the conveyor is envisioned notably in the following circumstances:
- when a biological analysis device is overloaded and there is another biological analysis device available that is able to perform all the required analyses (or, if the number of required analyses that it is able to perform exceeds a chosen quantity, for example 75% of the required analyses),
- when a biological analysis device is unable to perform all the analyses that need to be carried out on the tubes held in the rack,
- when all the biological analysis devices are overloaded, the conveyor acts as a buffer zone, thereby saving space and providing greater flexibility without additional expense or additional units.

It is important to note that transfer via the conveyor is performed only if one of these conditions is met. This is very different from existing systems which generally comprise an inlet buffer zone, an outlet buffer zone and an algorithm dictating distribution across the instruments in order to smooth the workload.

Specifically, this algorithm is applied systematically to existing systems in order to achieve a target work rate, but does not provide for adaptations to suit real-time requirements allowing the work rate to be sustained. In addition, the inlets and outlets of the devices form the exchange region for exchanges with the conveyor, which means that the inlet buffer zone and the outlet buffer zone of these systems are the only inlet and the only outlet, and are also potential bottlenecks.

According to the invention, because the system comprises several inlets, smoothing can be performed in part by the staff loading the racks onto the inlet stages, this naturally distributing the workload right from the time that it enters the system 2. The conveyor is used only to allow the system 2 to maintain its work rate, and when this is needed. The work rate is therefore sustained by managing the distribution at the level of the analysis devices rather than at the level of the inlet or the outlet of the system, by virtue of the separation between the inlet, the outlet, and the conveyor-exchange region of the devices. In addition, if the staff do not load the biological analysis devices uniformly, the work rate of the system can nevertheless be sustained by redirecting racks toward the less heavily loaded devices, within the limits of the predetermined quantity in order to avoid overloading equipment.

With reference to the outlet management strategies, according to one preferred embodiment of the invention, the controller 12 commands the outlet of the racks in such a way that a given rack leaves via the outlet of the device via which it was introduced, regardless as to which device actually carried out the analyses on the tubes it holds. That makes it possible to smooth the outlet workload in the sense that it will be distributed identically to the inlet workload. That also makes it possible to avoid an accumulation of racks 20 at those biological analysis devices that are able to carry out a higher number of tests than the others.

To complement this or as an alternative, the multiple outlets of the system may be used to perform a sorting operation at the outlet from the system 2. Thus, certain outlets may notably be dedicated outlets assigned according to the type of tests performed or to be performed subsequently, according to problems that have arisen during the analysis, according to the department of one or more of the test specimens in the racks, according to the assigned priority, etc.

If the outlet workload smoothing described in the previous paragraph is applied, then the outlets need to be separated according to the smoothing for which they are assigned:
  the one same outlet can be used only for outlet workload smoothing or only for sorting,
  the outlet workload smoothing will need to be performed slightly differently, it being necessary for the racks that have been introduced on a device the outlet of which is assigned to sorting, but which are not intended to be output via this outlet, to be distributed to the outlets assigned to outlet workload smoothing.

In the examples described above, the inlets and outlets of all the biological analysis devices are used as inlets or outlets for the system. As an alternative, it is possible for certain inlets and/or outlets not to be used in this way.

The outlet sorting complements the sorting of tubes 22 on a rack 20 that is allowed by a sample changer able to contain several racks, as described in French patent applications FR 1560889, FR1560890, and FR 1560893. Specifically, it is possible to sort the tubes by category and to place the tubes from the one same category in the one same rack. Sorting the racks at the outlet thus makes it possible to complete the tube-sorting solution in order to offer relevant sorting.

The outlet sorting of the racks allows one type of rack to be assigned to one particular device. This sorting can be performed on the basis of various parameters including in particular: in the event of an alarm raised regarding one tube in a rack; on the basis of the operations performed and/or yet to be performed on one or more tubes of a rack; on the basis of the demographics of the patient; on the basis of the value of the parameters being studied or else on the basis of the tube information.

As an alternative, it is also possible to describe a system in which the rack loading zone is at a single point, but the outlet zones of which may be multiple. This system would be able to implement the same smoothing and outlet sorting rules.

The invention claimed is:

1. A biological analysis system having a system inlet for inputting racks of tubes to be analyzed and a system outlet for outputting racks of tubes that have been analyzed, the system comprising:
  at least two biological analysis devices connected to one another by a conveyor, wherein a first one of the biological analysis devices comprises:
    at least one first analysis device inlet for inputting racks of tubes and at least one first analysis device outlet for outputting racks of tubes, and at least one first exchange device for the exchange of racks of tubes with the conveyor,
  wherein a second of the biological analysis devices comprises:
    at least one second analysis device inlet for inputting racks of tubes and at least one second analysis device outlet for outputting racks of tubes, and at least one second exchange device for the exchange of racks of tubes with the conveyor,
  wherein the system inlet comprises at least one of the first analysis device inlet or the second analysis device inlet, and the system outlet of the biological analysis system comprises at least one of the first analysis device outlet or the second analysis device outlet, the biological analysis system further comprising:
  a controller configured to command the biological analysis system to transfer a rack of tubes between the first exchange device and the second exchange device via the conveyor from a first one of the first and second analysis devices to a second one of the first and second analysis devices according to the operations to be performed on the tubes in that rack or according to a respective workload status of the at least the first and second biological analysis devices.

2. The biological analysis system of claim 1, wherein the controller is configured to command the biological analysis system to output a given rack of tubes via a chosen outlet of the first analysis device outlet and the second analysis device outlet of the biological analysis system according to a workload status of the first analysis device and the second analysis device.

3. The biological analysis system of claim 2, wherein the controller is configured to command the biological analysis system to output a given rack of tubes via a chosen outlet of the first analysis device outlet and the second analysis device outlet of the biological analysis system according to an event associated with the analysis of the tubes of the given rack of tubes or according to subsequent analyses scheduled for one or more of the tubes of that rack of tubes.

4. The biological analysis system of claim 2, wherein the controller is configured to command the biological analysis system to output a given rack of tubes via one of the first analysis device outlet and the second analysis device outlet chosen as a result of the analyses of the tubes of the given rack of tubes or according to a workload status of the first or second analysis device outlets.

5. The system as claimed in claim 1, wherein the controller is capable of controlling the system to transfer a given rack of tubes from the first biological analysis device to the second biological analysis device when the following conditions are met:
  the workload status of the first biological analysis device indicates an overload,
  the workload status of the second biological analysis device does not indicate an overload,
  the second biological analysis device is capable of performing at least some of the analyses scheduled for the tubes held in the given rack of tubes.

6. The system as claimed in claim 1, wherein the controller is configured to control the system to treat or process one or more tubes of a given rack of tubes at the same biological analysis device at which the tubes were introduced into via the respective biological device inlet the when the following conditions are met:
  the workload status of the biological analysis device does not indicate an overload,
  the biological analysis device is capable of performing at least some of the analyses scheduled for the tubes held in the given rack of tubes.

7. The biological analysis system as claimed in claim 1, wherein the controller is configured to control the system to output a given rack of tubes via the outlet of that biological analysis device that comprises the biological device inlet via which the given rack of tubes was introduced into the biological analysis system.

* * * * *